United States Patent
Delgado

(10) Patent No.: US 7,793,652 B1
(45) Date of Patent: Sep. 14, 2010

(54) SOLAR OPERATED WATER HEATER

(76) Inventor: Domingo Delgado, 10240 NW. 17 St., Coral Springs, FL (US) 33071

( * ) Notice: Subject to any disclaimer, the term of this patent is extended or adjusted under 35 U.S.C. 154(b) by 296 days.

(21) Appl. No.: 12/074,021

(22) Filed: Mar. 1, 2008

(51) Int. Cl.
*F24J 2/42* (2006.01)

(52) U.S. Cl. ............ 126/565; 126/561; 126/562; 126/573; 126/576; 126/600; 165/48.2; 165/118; 165/132; 165/146; 4/493; 4/498; 136/243

(58) Field of Classification Search ............ 126/565, 126/561, 564, 562, 563, 566, 567, 568, 171, 126/573, 576, 600, 605, 698; 4/498, 493; 136/243; 165/48.2, 118, 132, 146, 163
See application file for complete search history.

(56) References Cited

U.S. PATENT DOCUMENTS

| | | | | | |
|---|---|---|---|---|---|
| 3,390,056 | A | * | 6/1968 | Ingram | 202/83 |
| 3,598,104 | A | * | 8/1971 | Trostler | 126/566 |
| 4,106,485 | A | * | 8/1978 | Polley | 126/576 |
| 4,291,672 | A | * | 9/1981 | Ricks | 126/565 |
| 4,360,004 | A | * | 11/1982 | Testolini | 126/565 |
| 4,475,535 | A | * | 10/1984 | Assaf | 126/568 |
| 4,756,300 | A | * | 7/1988 | Ewers | 126/567 |
| 4,875,466 | A | * | 10/1989 | Slonneger | 126/565 |
| 6,220,241 | B1 | * | 4/2001 | Yeomans | 126/565 |
| 2008/0210291 | A1 | * | 9/2008 | Grimm | 136/246 |

* cited by examiner

*Primary Examiner*—Steven B McAllister
*Assistant Examiner*—Avinash Savani
(74) *Attorney, Agent, or Firm*—Kenneth E. Merklen

(57) ABSTRACT

A free-floating, integrated, solar operated water heater appliance, for heating the body of water includes a flotation device for buoyantly supporting the appliance in the body of water. A water heater element, fueled by solar energy, heats water pumped through the heater element by an integral pump, driven by solar energy. A solar energy reflector/container supports the heater element and concentrates solar energy onto the outer surface of the heater element. A parabolic dish reflector concentrates solar energy onto the inner surface of the heater element. Water is circulated through the heater element and returned, in elevated temperature, to the body of water.

16 Claims, 3 Drawing Sheets

SOLAR OPERATED WATER HEATER

FIELD OF THE INVENTION

The present invention relates to solar operated water heating devices, in particular a self-contained, solar operated, buoyant heat absorbent and heat transfer appliance, for heating a controlled fluid, such as water in a swimming pool, for example.

SUMMARY OF THE INVENTION

The presence and use of a swimming pool as a residential accessory is very great in today's society. In-the-ground swimming pools are very popular as residential accessories, in the warmer parts of the continental United States but are not limited to the warmer climes. Above-the-ground swimming pools are also very popular, especially where the residence is short of land area, for the pool. When the weather is warm and/or the sun is shining, the temperature of the water in the pool tends to warm and being in the pool water appears to be more enjoyable. When weather temperature gets cool and/or cold, use of the pool tends to be limited. In order to extend the use and/or enjoyment of a swimming pool in an environment where the weather becomes cool and/or cold, pool water heater appliances are frequently used. Many pool water heater appliance use natural or propane gas as fuel to heat the water of the pool. Heating the water of the swimming is preferred by many, especially in cool and/or cold weather, when the water in the pool becomes substantially lower in temperature than normal body temperature.

The problem with available pool water heaters is that the pool water heating appliance is large, cumbersome and expensive. The temperature of the water of a swimming pool, whether it be an in-the-ground or an above-the-ground swimming pool, may often be raised substantially above ambient temperature, using presently conventional swimming pool water warming appliances, however, this is often an over-kill and this is wasteful and expensive. It is very often found that the initial cost of the swimming pool water warming appliance is very high and the appliance is costly to run. The over-kill use, that often occurs, is a waste of energy and money. What is needed is a heater for the water of a swimming pool that is initially low in cost and inexpensive to run. The present invention is a self-contained or integrated swimming pool water heating appliance which is buoyantly floated in the water contained in the swimming pool and uses solar energy to warm the water of the swimming pool.

The present invention is a self-contained, in-the-water appliance of assembled conventional technology, in a novel combination and relationship providing functionally fashioned solar heat absorbing and heat transfer materials suspended, buoyantly, in an air and water environment for heating water in a controlled environment, such as a swimming pool, for example. Solar heat energy is directed to and/or concentrated on functional elements fabricated from heat absorbing and heat transfer materials, in a contained water environment. The functionally fashioned solar heat absorbing and heat transfer materials, such as heat exchange materials, for example, are exposed to solar rays and absorb heat energy from the sun. The absorbed heat is transferred from the heat exchange unit to the water in contact with the heat exchange unit. The water heated within the heat exchange unit rises, naturally, as the water is heated, initiating a water flow or circulation through the heat exchange unit. In order to ensure a discrete water flow through the heat exchange unit, a water pump means, such as a sump pump, for example, is provided.

The input to the water pump means is connected to the unheated body of water adjacent the buoyantly floating water heater so that unheated water, of the contained water, is gently applied to the heat exchange unit of the integrated water heater.

As circulation is initiated, water, of relatively low temperature, flows through the integrated heater element and is heated. The heated water flows out an upper outlet of the water heater, flowing, in cascade fashion, over the exterior surface of the heat transfer element. The flowing, heated water is further heated as the water cascades over the exterior of the heat transfer element. A catch basin or trough is provided at the base of the heat transfer element. One or more water returns, connected to the catch basin, return the collected, heated water to the contained body of water. The returned, heated water causes the temperature of the body of water to rise, appropriately. A preferred embodiment of this invention provides a floating appliance which consumes solar energy and is essentially cost free to operate.

In a preferred embodiment, the present invention provides a self-contained, free floating water heater that heats water of a body of water by applying direct solar energy and reflected solar energy onto heat exchange elements fabricated from materials that have good to excellent solar energy and heat transfer characteristics. Solar energy is collected and employed to heat water through the vehicle of a heat exchange unit or heat-sink device. A flotation apparatus, which may be in the form of a ring of buoyant material and supporting pedestal, supports the water heater in a partially submerged attitude in an air/water environment, within a controlled body of water.

The heat exchange unit nests in a substantially sealed reflector/container vessel. The vessel also supports a parabolic solar energy reflector between the base of the vessel and the heat exchange unit. The interior wall of the reflector/container vessel receives direct solar energy and reflects the direct solar energy on to the outer exterior surface of the heat exchange unit, while the parabolic solar energy reflector receives a second direct solar energy and reflects the second direct solar energy on to an inner exterior surface of the heat exchange unit.

Preferably, a reflector/container vessel is supported, buoyantly in a body of water. An inner wall of the reflector/container vessel is fabricated to provide good to excellent solar energy reflection and directional reflection characteristics. Solar energy applied directly from the sun to the surface of the inner wall is reflectively directed to the interior area of the reflector/container vessel. A heat exchange element is nested in the interior area of the reflector/container vessel for receiving solar energy reflected and directed from the inner wall of the reflector/container vessel. The reflected, directed solar energy from the inner wall is applied to the outer surface of the heat exchange element. The heat exchange element is oriented in the interior area of the reflector/container vessel so that the outer surface of the heat exchange element receives solar energy directly from the sun. Thus, the outer surface of the heat exchange element receives a concentration of direct solar energy, from the sun and reflectively directed solar energy from the inner wall of the reflector/container vessel, for heating water passed through the heat exchange element.

A parabolic dish reflector of solar energy provides additional reflected solar energy, reflected on to the inner surface of the heat exchange element. The parabolic dish reflector is contoured and oriented between the reflector/container vessel and the heat exchange element, for receiving solar energy directly from the sun and for reflecting the received solar energy on to the inner surface of the heat exchange element for further heating water passed through the heat exchange element.

Preferably, the heat exchange element is defined by an elongated tube disposed in serpentine configuration, with adjacent exterior walls of the serpentine configuration connected defining a substantially cone-shaped, hollow or chamber walled vessel. The materials from which the heat exchange element is fabricated have good to excellent heat absorbent and/or heat exchange characteristics. The chamber of the heat exchange element has an input or inlet at one end and an output or outlet at the other end. The inlet of the chamber is connected to the output of a submerged pump, for example a sump pump or a low power, low volume water pump, for maintaining a flow of water through the length of the coiled tubing defining the chamber of the heat exchange element. The outlet of the chamber ejects an exiting flow of heated water, in cascade arrangement, over the outer exterior wall of the cone-shaped vessel. The cascading water is further heated by the outer exterior wall of the vessel and is collected by a catch basin coupled to the base of the outer, exterior wall, adjacent an open portion of the vessel. Drains from the catch basin pass through ports in the wall of the reflector/container vessel and return the recovered, heated water to the body of the contained water.

The reflector/container vessel is supported on a pedestal and a flotation means so that the reflector/container vessel floats substantially on the surface of the body of contained water.

A power supply, which may be solar voltaic cells or variable temperature voltaic cells, may be mounted on or adjacent the exterior wall of the reflector/container vessel and connected to provide power to drive a submerged water pump means, for initiating and/or sustaining the flow of water through the heat exchange element. Alternatively, the power supply for the submerged water pump may be a battery which compliments the self-contained, free flotation characteristic of the invention. If desired, a hard wire line may be used to provide power for the submerged water pump. If a hard or solid wire connection is used to connect the flotation device to residential current, for example, the free flotation characteristic is reduced somewhat, according to the size and length of the wire connection.

In an alternative arrangement the heat exchange element of the invention may be in the form of a hollow walled vessel, defining a chamber, with heat-sink vanes, spanning the width of the chamber, connected between opposing walls. The chamber has an input and an output for passing water through the chamber. The internal vanes connect to opposing walls and receive heat from the walls by conduction. Heat is transferred from the vanes and the walls to water passing through the chamber. The input to the chamber is connected to the output of the pump means for receiving water from the pump. The output from the chamber permits water passed through the chamber to exit the chamber and flowingly cascade over the exterior surface of the outside wall of the hollow walled vessel. One or both of the walls of the hollow walled vessel may be waved, thereby increasing the length and/or area of the surface of the wall without increasing the size of the vessel. The heat-sink vanes may be perforated, thereby increasing the surface area of the vane and thus increasing the heat transfer capability of the vane.

OBJECTS OF THE INVENTION

It is an object of the invention to provide a self-contained heater accessory for heating water of a swimming pool that buoyantly floats in the body of water to be heated and uses solar energy for warming the water of the pool.

Another object is to provide a self-sufficient heater appliance for heating the water of a swimming pool that uses solar energy to heat the water and buoyantly floats in the body of water to be heated.

Another object is to provide a self-contained appliance, buoyantly floatable in the body of water contained in a swimming pool for heating the water of the swimming pool using solar energy to heat the water and circulate the water through the heating element.

A further object is to provide a heater appliance for the water of a swimming pool which is free floating, within the water to be heated, self sufficient, low in cost to operate, and will not waste energy in over heating the water.

These and other objectives will become apparent after viewing the following drawing showing embodiments of the invention and reading the following description thereof.

DETAILED DESCRIPTION OF THE INVENTION

Figure 1:
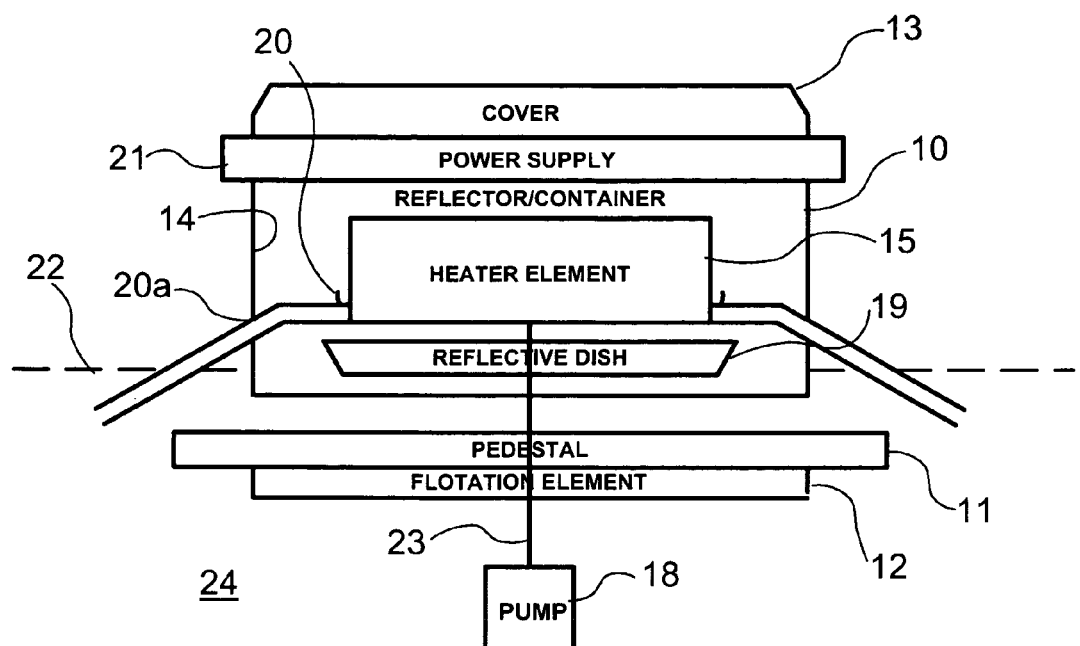
FIG. 1 is a block diagram of the invention.

Throughout the several Figures, identical call outs are used to identify identical structure. FIG. 1 is a block diagram representing the invention. Block 10, REFLECTOR/CONTAINER, is supported on block 11, PEDISTAL, which is supported on block 12, FLOTATION ELEMENT. The flotation element holds the invention afloat in a body of water 24, such as a swimming pool, for example. The HEATER ELEMENT, block 15, is supported in the interior of the reflector/container 10, over REFLECTOR DISH, block 19. Block 18, PUMP, is connected with the heater element 15 by a conduit 23, the pump 18 being submerged in the body of water 24. The heater element includes a catch basin 20 and drains 20a. Block 21, POWER SUPPLY, provides power for driving the pump 18, providing a self-sufficient appliance.

The invention is a self-sufficient, buoyantly floated water heater appliance for heating a contained body of water, for example, water in a swimming pool. A reflector/container 10 is held afloat, by a flotation means, in a body of contained water, such as water in a swimming pool, for example. The flotation means comprises a pedestal 11 and a flotation element 12. The pedestal supports the reflector/container 10 and the flotation element supports the pedestal. The flotation element has sufficient buoyancy to lift and maintain a substantial portion of the reflector/container 10 above the surface 22 of the body of water 24. The reflector/container 10 has a cover 13 which is preferably fabricated from materials having characteristics which are highly transparent to solar rays and/or solar heat and/or solar energy (hereinafter referred to as solar energy). The surface of the interior wall 14 of the reflector/container 10 is fabricated from materials and/or has a finish which highly reflects, and directs solar energy received from the sun for concentrating and directing the received solar energy on to the outer surface of the heater element 15. The cover 13 is fabricated for passing solar energy and for retaining heat in the interior of the reflector/container 10, generating a greenhouse effect in the enclosed reflector/container vessel. The heater element 15 is preferably fabricated from materials having good to excellent solar energy absorbing characteristics and good to excellent heat transfer characteristics. A submerged water pump 18, such as a sump pump means, for example, secured below the flotation member, has an input connected to the body of water in which the water pump is submerged and has an output connected to the input of the heater element 15. The heater element 15 nests in the interior of the reflector/container 10, over a parabolic dish solar energy reflector 19. The parabolic dish is fabricated from materials, and has a surface having good to excellent solar energy reflection characteristics. The position and contour of the parabolic dish reflector 19 is such so as to reflect solar energy in a concentrated reflection, on to the inner exterior surface of the heater element 15, through the open bottom of the heater element. Water pumped into the input or inlet of the heater element 15 by the pump 18 flows or circulates through the heater element and out the output or outlet of the heater element, cascading over the outer exterior surface of the heater element and into a catch basin or trough 20. The water is heated while the water is in contact with the heater element. The heated water is returned to the body of water in the swimming pool through a drain 20a.

A power supply 21, which is preferably an array of solar cells or photovoltaic cells, is supported on the outer wall of the reflector/container 10. The power supply is connected to the pump 18 for driving the pump. Alternatively, the power supply may be an array of variable temperature voltaic cells supported between the air and water adjacent the outer wall of the reflector/container 10. If desired, a battery may be used as the power supply, the battery supported on the outer wall of the reflector/container 10.

Preferably, the water heater appliance floats buoyantly in the body of water 24 in the swimming pool so that the surface 22 of the water is approximately in juxtaposition with the base or bottom of the reflector/container 10. A conductor 23 defined by a pipe or tubing, provides a conduit for the water pumped from the body of water 24 to the heater element 15 by the pump 18. The conductor 23 also serves as a means for suspending the pump in the body of water 24. A port in the base of the reflector/container permits passage of the conductor 23. The port and conductor form a water tight seal and prevent leakage into the interior of the reflector/container. The conductor 23 also passes through ports in the pedestal 11 and flotation member 12, as well as the parabolic dish 19. Drains 20a, from the catch basin 20, return water from the catch basin to the body of water 24, some what below the surface 22 of the water. It will be obvious that water, of ambient temperature, pumped from the body of water by the pump member is forcefully flowed through the heating element. The heating element is heated above ambient temperature by solar energy applied to the surfaces of the heating element. The heating element is a heat exchange unit. As the water flows through the interior of the heating element the flowing water is elevated in temperature, above the ambient temperature of the body of water. The water flows out of the heating element, somewhat elevated in temperature above the ambient of the body of water and cascades over the exterior of the heating element. Cascading the water over the exterior surface of the heating element further elevates the temperature of the water. The twice temperature-elevated water is returned to the body of water, from which it was taken, to raise the temperature of the body of water, appropriately.

Figure 2:
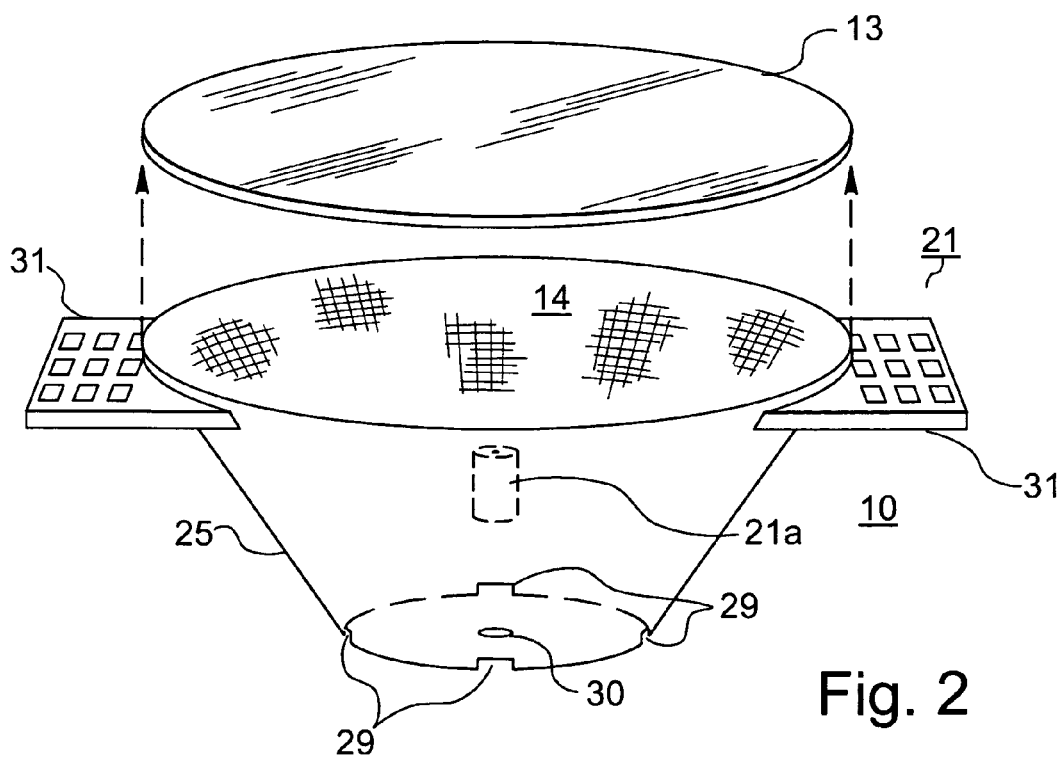
FIG. 2 is a perspective view of the heater element container and heat collector of the invention.

FIG. 2 represents a preferred embodiment of a reflector/container 10 (FIG. 1) usable in practicing the invention. A generally inverted cone-shaped member 25 has the surface of interior walls 14 fabricated for providing good to excellent direction and reflection characteristics for solar energy. The heater element 15 of FIG. 1 is supported in the interior of the reflector/container 10 with ports 29 provided for accepting the drains 20a of the catch basin 20. Preferably, each drain 20a fits into and extend out of a port 29 aligned to receive the drain. Each drain fits in a port in water-tight relationship, keeping water out of the reflector/container interior when the heater element 15 is nested in the reflector/container 10. The drains 20a return water to the body of water 24 somewhat below the surface 20. A port 30 is provided in the base of the reflector/container for passing the conduit 23, in sealed relationship.

An array 31 represents a power supply 21 in balanced array supported on the exterior wall 25 of the reflector/container 10. The connection (not shown) between the power supply and the pump (FIGS. 1 and 3) for driving the pump will be apparent to those skilled in the art. The cover or seal 13 for enclosing the reflector/container is fabricated from materials having good to excellent solar energy transmitting and thermal retaining characteristics. When the cover plate 13 is covering the open top of the reflector/container 10 and the heater element 15 is nested in the interior of the reflector/container, solar energy passing through the cover 13 is directly applied to the outer, exterior surface of the heater element 15 and to the interior wall surface 14 of the reflector/container 10. Solar energy applied to the interior wall surface 14 of the reflector/container is reflected and applied to the outer, exterior surface of the heater element 15. The combined direct application of solar energy and reflected application of solar energy on to the outer, exterior surface of the heater element defines a concentrated application of solar energy on the outer, exterior surface of the heater element 15. With the cover 13 fitted to the top of the reflector/container a greenhouse effect is provided. Application of solar energy to the inner exterior surface of the heater element is discussed below.

It may be desired to use an alternate, additional and/or back-up power supply. A battery 21a, represented in broken line form, may be used, if desired, when practicing the invention.

Figure 3:
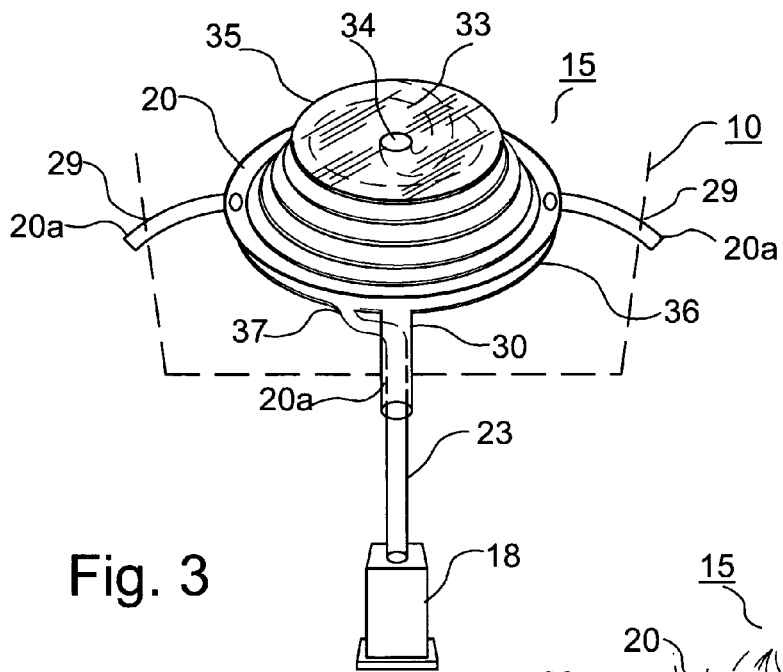
FIG. 3 is a perspective view of an embodiment of the heater element of the invention, connected to a pump means.

FIG. 3 represents a preferred embodiment of a heater element or heat exchange element, usable when practicing the invention. The heater element 15 is fabricated from tubing materials having good to excellent heat transfer characteristics. The tubing is helically disposed with longitudinal edges of adjacent tubing connected, defining a cone-shaped vessel with a hollow, serpentine chamber within its walls. The top of the cone-shaped vessel is closed 33 and has an outlet 34 which connects with the upper end of the tubing or chamber for ejecting water passed through the chamber, for cascading over the outer wall 35. The outer exterior 35 of the hollow wall defines a semi-tube cascaded wall, which terminates in open configuration 36. The chamber has an inlet 37 which communicates with the conduit 23 extending from the pump 18, for receiving water pumped by the pump. Adjacent the open base of the cone-shaped chambered vessel is a catch basin or trough 20 with drains 20a. The drains extend out ports 29 for supporting the heater element 15 in the reflector/container 10.

Figure 4:
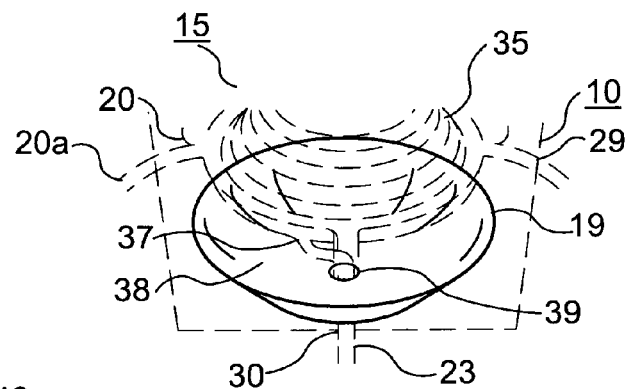
FIG. 4 is a perspective view of a parabolic dish for reflecting solar heat toward the inner surface of the heater element of the invention.

FIG. 4 represents a preferred embodiment of a parabolic dish reflector 19 which is supported in the interior of the reflector/container 10. The heater element (represented in broken line form in FIG. 4) nests in the reflector/container 10 above the parabolic dish reflector 19. The inner exterior surface 38 of the parabolic dish reflector is fabricated and finished for reflecting solar energy. The dish 19 is adapted and oriented to receive, reflect and concentrate solar energy received through the cover 13, on to the inner exterior surface of the heater element 15 through the open bottom of the cone-shaped vessel. The parabolic dish 19 has a port 39 through which the conduit 23 passes to connect with the inlet 37 on the heater element 15.

Figure 5:
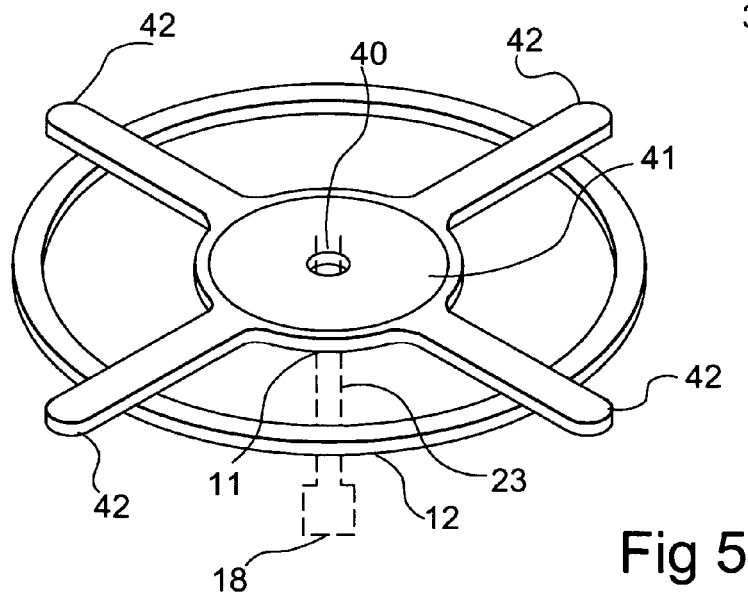
FIG. 5 is a perspective view of the support pedestal and flotation element for the invention.

FIG. 5 represents an embodiment of a pedestal 11 and flotation member 12 which holds the invention afloat in a body of water. A port 40 in the base 41 of the pedestal permits passage of the conduit 23 (shown in broken line-form) through the base of the pedestal, for communicating with the inlet to the chamber of the heater element. The pedestal fingers 42 provide support for the reflector/container vessel. The flotation member 12 has sufficient buoyancy, in water, to hold and maintain the appliance afloat in the body of water.

Figure 6:
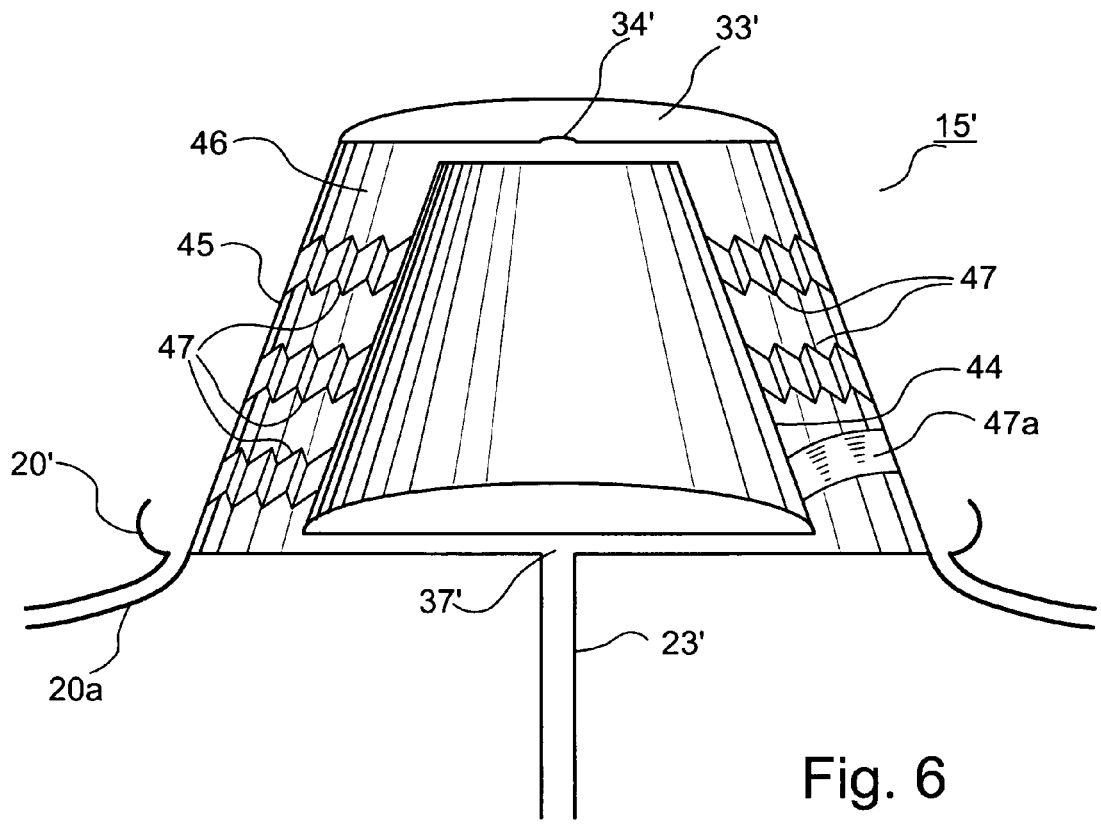
FIG. 6 is a partial cut out, side elevation view of an alternate embodiment of a heater element usable in practicing the invention.

FIG. 6 represents, in cross-section elevation view, an alternate structure heat exchange element 15', which may be used when practicing the invention, in substitution for the preferred embodiment. A hollow walled inverted cone-shaped vessel is defined by inner wall 44 and outer wall 45, defining a chamber 46. Heat-sink vanes 47 and 47a are secured, at their respective opposite ends, to opposing walls of the chamber. Although a plurality of vanes is represented, a single elongated vane may be used, if desired. Although heat transfer vanes are represented as spanned across the interior of a chamber, the structure may be reversed, and the vanes may be exposed to solar energy and a tube or tubes may pass through the vanes. The vanes are fabricated from materials having good to excellent heat transfer characteristics. The vanes 47 and 47a receive heat from walls 44 and 45, via conduction. The walls are heated by solar energy, as previously discussed. Water pumped through conduit 23' flows through the chamber 46, coming in contact with the vanes 47, 47a which transfer heat to the water. Water flows out the outlet 34, across the closed top 33' and down the outer wall 45 to the catch basin 20' and out the spout 20a'. The inner exterior surface of wall 44 may be heated by a solar energy reflecting dish, such as represented in FIG. 4 and disposed as discussed above.

Figure 6A:
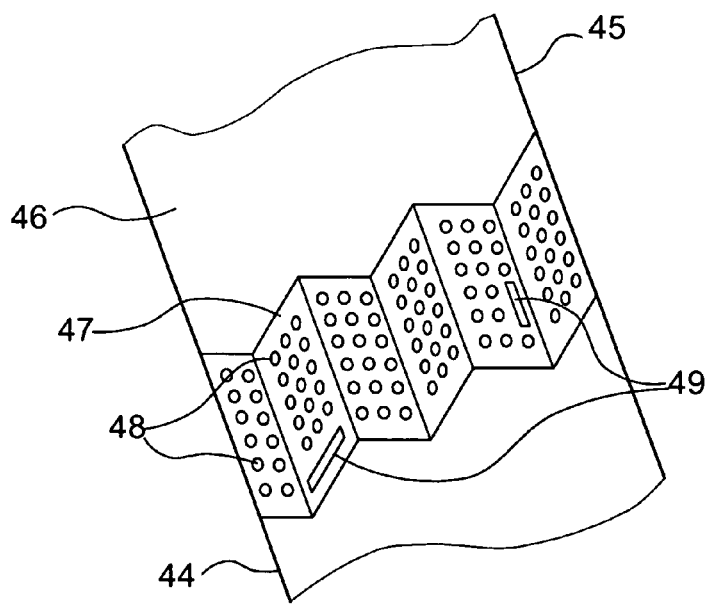
FIG. 6a is an exploded view of one embodiment of a heat sink vane useful in practicing the invention using the embodiment represented in FIG. 6.

FIG. 6a represents, in cut-out view, a heat transfer vane, such as 47 that is connected to the spaced walls 44 and 45. The heat transfer vane has holes, such as 48 and/or 49, which increase the surface of the vane and increase the heat exchange capability of the vane. The vane is fabricated from materials having good to excellent heat transfer characteristics.

In the foregoing description of the invention, reference to drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, suggested or described.

Having now described a preferred embodiment of the invention in terms of features, discoveries and principles along with certain alternative structure and suggested changes, other changes that may become apparent to those skilled in the art may be made, without departing from the scope of the invention defined in the appended claims.

What is claimed is:

1. An apparatus for heating water in a contained environment comprising:
   a) a flotation means for buoyantly supporting said apparatus in a body of contained water;
   b) a reflective container member supported on said flotation means for substantially floating on a surface of said body of contained water, said reflective container member having a reflective inner wall for receiving a first solar energy directly from a sun and for reflecting said first solar energy to an interior of said reflective container member;
   c) a heat exchange member having an outer surface and an inner surface, said heat exchange member supported in said interior of said reflective container member for receiving a second solar energy directly from said sun on said outer surface and for receiving said first solar energy, reflected from said inner wall, on said outer surface;
   d) a dish reflector member supported in said reflective container member between said reflective container member and said heat exchange member, said dish reflector member for receiving a third solar energy directly from said sun and for reflecting said third solar energy on to said inner surface of said heat exchange member;
   e) a pump means connected to an input of said heat exchange member for pumping a water from said body of contained water into said heat exchange member via said input, said pump means supported submerged in said body of contained water;
   f) a photovoltaic power supply for driving said pump means; and
   g) a means for catching water located under the heat exchange means for catching water from an outlet means of the heat exchange member.

2. An apparatus for heating water as in claim 1 and said heat exchange member includes:
   a) the outlet means for ejecting said water pumped into said heat exchange member for flowing said water over said outer surface of said heat exchange member; and
   b) the means for catching water catches the water flowed over said outer surface of said heat exchange member and for returning said water to said body of contained water.

3. An apparatus for heating water as in claim 1 and in which said power supply means is one or more solar cells.

4. An apparatus for heating water as in claim 3 and in which said power supply is a battery.

5. An apparatus for heating water as in claim 2 and in which said means for catching said water includes a catch basin means and a drain means, said drain means extending from said catch basin means, and said reflective container member includes a port means for receiving said drain extending from said catch basin means and said drain extends out said port means for returning said water to said body of contained water and said drain, in said port means, supports said heat exchange member in said interior of said reflective container member.

6. An apparatus for heating water as in claim 1 and in which said heat exchange member is defined by a hollow, serpentine chamber having an inlet means at an end thereof and an outlet means at another end thereof, and said inlet means is connected to said pump means for receiving said water pumped by said pump means.

7. An apparatus for heating water as in claim 1 and in which said heat exchange member is an elongated tubular hollow chamber oriented in serpentine configuration, with adjacent outer longitudinal surfaces of said elongated tubular hollow chamber connected for defining a cone-shaped vessel defining said inner surface and said outer surface and said elongated tubular hollow chamber includes an inlet means and an outlet means and said inlet means is coupled to said pump means for receiving said water pumped by said pump means into said elongated tubular hollow chamber.

8. An apparatus for heating water as in claim 7 and said water pumped by said pump means into said elongated tubular hollow chamber flows through said elongated tubular hollow chamber and out said outlet means and said water is directed for flowing over said outer surface of said heat exchange member.

9. An apparatus for heating water as in claim 1 and in which said heat exchange member is an elongated hollow chamber defined by opposing side walls and said heat exchange member further includes heat sink fin means and said heat sink fin means have at least an end thereof connected to at least a side wall of said opposing side walls.

10. A self-contained, solar operated water heating apparatus for heating a body of water contained in a swimming pool comprising:
   a) a flotation means for buoyantly floating said apparatus in said body of water;
   b) a reflective container member supported on said flotation means for substantially floating said reflective container member on a surface of said body of water, said reflective container member having an interior wall for receiving a first solar energy directly from a sun and for reflecting said first solar energy;
   c) a heat exchange member supported in an interior of said reflective container member for receiving a second solar energy directly from said sun and for receiving said first solar energy reflected from said interior wall of said reflective container member;
   d) a pump means, supported by said flotation means and maintained submerged in said body of water, said pump means connected to said heat exchange member for pumping a water from said body of contained water into a chamber of said heat exchange member; e) said chamber of said heat exchange member defined by an elongated member having an input at a first end thereof and an output at a second end thereof, said input for receiving said water from said pump means and said output located at a top portion of the heat exchange member for ejecting said water out of said chamber and over an outer exterior of said heat exchange member to be further heated;
   f) a catch basin means adjacent said outer exterior for catching said water ejected from said chamber and returning said water to said body of contained water; and
   g) a self-contained power supply for driving said pump means.

11. A self-contained, solar operated water heating apparatus as in claim 10 and in which said chamber is defined by an elongated tubular member having good to excellent heat transfer characteristics, said tubular member in serpentine configuration with adjacent lengths of said tubular member coupled together for defining a vessel.

12. A self-contained solar operated water heating apparatus as in claim 10 and in which said self-contained power supply is a plurality of solar cells supported by an outer exterior of said reflective container member.

13. A self-contained solar operated water heating apparatus as in claim 10 and in which said self-contained power supply is a battery.

14. A self-contained solar operated water heating apparatus as in claim 10 and in which said catch basin means includes a drain means for returning water ejected from said output to said body of contained water.

15. A self-contained solar operated water heating apparatus as in claim 10 and in which said reflective container member includes a port for receiving said drain and said drain supports said heat exchange member in said reflective container member when said drain is positioned in said port.

16. A self-contained solar operated water heating apparatus, as in claim 10 and further including a parabolic dish reflector means, disposed between said reflective container member and said heat exchange member for receiving a third solar energy directly from said sun and for reflecting said third solar energy on an inner exterior of said heat exchange member.

\* \* \* \* \*